US012576522B2

(12) United States Patent
Park et al.

(10) Patent No.: US 12,576,522 B2
(45) Date of Patent: Mar. 17, 2026

(54) DRUM COUPLING AUTOMATION ROBOT AND DRUM COUPLING AUTOMATION METHOD

(71) Applicant: Samsung Electronics Co., Ltd., Suwon-si (KR)

(72) Inventors: Shibaek Park, Suwon-si (KR); Hansung Kim, Changwon-si (KR); Sunghun Jeong, Changwon-si (KR)

(73) Assignees: SAMSUNG ELECTRONICS CO., LTD., Suwon-si (KR); Industry-Academic Cooperation Foundation of Kyungnam University, Changwon-si (KR)

( * ) Notice: Subject to any disclaimer, the term of this patent is extended or adjusted under 35 U.S.C. 154(b) by 21 days.

(21) Appl. No.: 18/602,271

(22) Filed: Mar. 12, 2024

(65) Prior Publication Data

US 2024/0308069 A1     Sep. 19, 2024

(30) Foreign Application Priority Data

Mar. 13, 2023     (KR) ........................ 10-2023-0032818

(51) Int. Cl.
B25J 9/16          (2006.01)
B25J 15/08         (2006.01)

(52) U.S. Cl.
CPC ........... B25J 9/1633 (2013.01); B25J 9/1697 (2013.01); B25J 15/08 (2013.01)

(58) Field of Classification Search
CPC ........ B25J 9/1633; B25J 9/1697; B25J 15/08; B25J 13/085; B25J 19/023; B25J 15/0066; B25J 5/007; B25J 9/162; B25J 17/0216; B25J 19/02
See application file for complete search history.

(56) References Cited

U.S. PATENT DOCUMENTS

| | | | |
|---|---|---|---|
| 8,855,824 B2 * | 10/2014 | Ogami | ................... B25J 9/1697 |
| | | | 700/250 |
| 10,807,744 B1 * | 10/2020 | Seiver | ....................... B67B 7/42 |
| 11,136,150 B1 | 10/2021 | Seiver et al. | |
| | (Continued) | | |

FOREIGN PATENT DOCUMENTS

| | | |
|---|---|---|
| KR | 10-1876676 B1 | 7/2018 |
| KR | 10-1894482 B1 | 9/2018 |
| | (Continued) | |

OTHER PUBLICATIONS

Hang Sung Kim, "Design of a 6-axis Compliance Device with F/T Sensing for Position/Force Control," Journal of the Korean Society of Industry Convergence, 2018, pp. 63-70, vol. 21 Issue 2.

*Primary Examiner* — Robert T Nguyen

(74) *Attorney, Agent, or Firm* — Muir Patent Law, PLLC

(57) ABSTRACT

A drum coupling automation robot includes a robot, a robot arm attached to the robot, a coupler gripper connected to the robot arm, a force and torque sensor connecting one end of the robot arm to the coupler gripper and measuring force and torque applied to the coupler gripper, a vision sensor attached to the force and torque sensor, and a control circuit electrically connected to the robot, the robot arm, the coupler gripper, the force and torque sensor, and the vision sensor.

20 Claims, 9 Drawing Sheets

(56) References Cited

U.S. PATENT DOCUMENTS

| | | | | |
|---|---|---|---|---|
| 11,613,012 | B2 * | 3/2023 | Satou | B25J 9/1633 |
| | | | | 700/258 |
| 2019/0127206 | A1 * | 5/2019 | Lu | B23P 19/046 |
| 2022/0079687 | A1 * | 3/2022 | Sexson | A61B 34/20 |
| 2022/0410406 | A1 * | 12/2022 | Jung | B25J 15/024 |
| 2023/0296640 | A1 * | 9/2023 | Guarracina | G01N 35/0099 |
| | | | | 700/228 |

FOREIGN PATENT DOCUMENTS

| | | | |
|---|---|---|---|
| KR | 10-1917943 | B1 | 11/2018 |
| KR | 10-1944172 | B1 | 1/2019 |
| KR | 10-2200712 | B1 | 1/2021 |
| KR | 10-2207227 | B1 | 1/2021 |
| KR | 10-2021-0061237 | A | 5/2021 |
| KR | 10-2277046 | B1 | 7/2021 |
| KR | 10-2022-0111382 | A | 8/2022 |
| KR | 10-2022-0113121 | A | 8/2022 |

* cited by examiner

DRUM COUPLING AUTOMATION ROBOT AND DRUM COUPLING AUTOMATION METHOD

CROSS-REFERENCE TO RELATED APPLICATION

This application is based on and claims priority under 35 U.S.C. § 119 to Korean Patent Application No. 10-2023-0032818, filed on Mar. 13, 2023, in the Korean Intellectual Property Office, the disclosure of which is incorporated by reference herein in its entirety.

BACKGROUND

The inventive concept relates to a drum coupling automation robot and a drum coupling automation method.

An automated coupler system for drums is done through a dedicated coupler. The drums may be containers storing liquid chemicals to be used for semiconductor processes. The cost of configuring the dedicated coupler may be high, and when the automated coupler system is manually operated, it may be difficult to operate the dedicated coupler. In addition, there is a possibility that workers may be exposed to chemicals due to difficulties in operation.

SUMMARY

The inventive concept provides an automation robot and an automation method for automated drum coupling using a general-shaped coupler.

The task to be solved by the technical idea of the inventive concept is not limited to the above-mentioned task, and other tasks not mentioned may be clearly understood by those of ordinary skill in the art from the following description.

According to an embodiment of the present disclosure, a drum coupling automation robot includes a robot, a robot arm attached to the robot, a coupler gripper connected to the robot arm, a force and torque sensor connecting one end of the robot arm to the coupler gripper and configured to measure force and torque applied to the coupler gripper, wherein the coupler gripper includes a body unit connected to one end of the force and torque sensor, a finger configured to hold a portion of a coupler, wherein the coupler is provided with a coupler key code that is engaged with a drum key code provided with a drum hole of a drum, a first roller engaged with the coupler key code of the coupler, wherein the first roller engaged with the coupler key code of the coupler is configured to rotate, and a second roller engaged with a coupler nut provided with the coupler, wherein the second roller engaged with the coupler nut of the coupler is configured to rotate to fasten the coupler nut to the drum hole, a vision sensor attached to the force and torque sensor, and a control circuit electrically connected to the robot, the robot arm, the coupler gripper, the force and torque sensor, and the vision sensor.

According to an embodiment of the present disclosure, a drum coupling automation method includes moving a drum coupling robot with a robot arm to a drum, wherein the robot arm is connected to a coupler gripper, gripping a coupler using the coupler gripper, inserting the coupler into a drum hole of the drum using the coupler gripper, coupling a coupler key code of the coupler with a drum key code of the drum using the coupler gripper, and fastening a coupler nut of the coupler to the drum hole using the coupler gripper.

According to an embodiment of the present disclosure, a drum coupling automation robot includes a robot, a first robot arm and a second robot arm attached the robot, a first coupler gripper coupled to a first end of the first robot arm, a second coupler gripper coupled to a second end of the second robot arm, a first force and torque sensor disposed between the first coupler gripper and the first end of the first robot arm and configured to measure force and torque applied to the first coupler gripper, a second force and torque sensor disposed between the second coupler gripper and the second end of the second robot arm and configured to measure force and torque applied to the second coupler gripper, two or more vision sensors attached to each of the first and second force and torque sensors, and a control circuit connected to the robot, the first robot arm, the second robot arm, the first coupler gripper, the second coupler gripper, the first force and torque sensor, the second force and torque sensor, and the two or more vision sensors attached to each of the first and second force and torque sensors.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
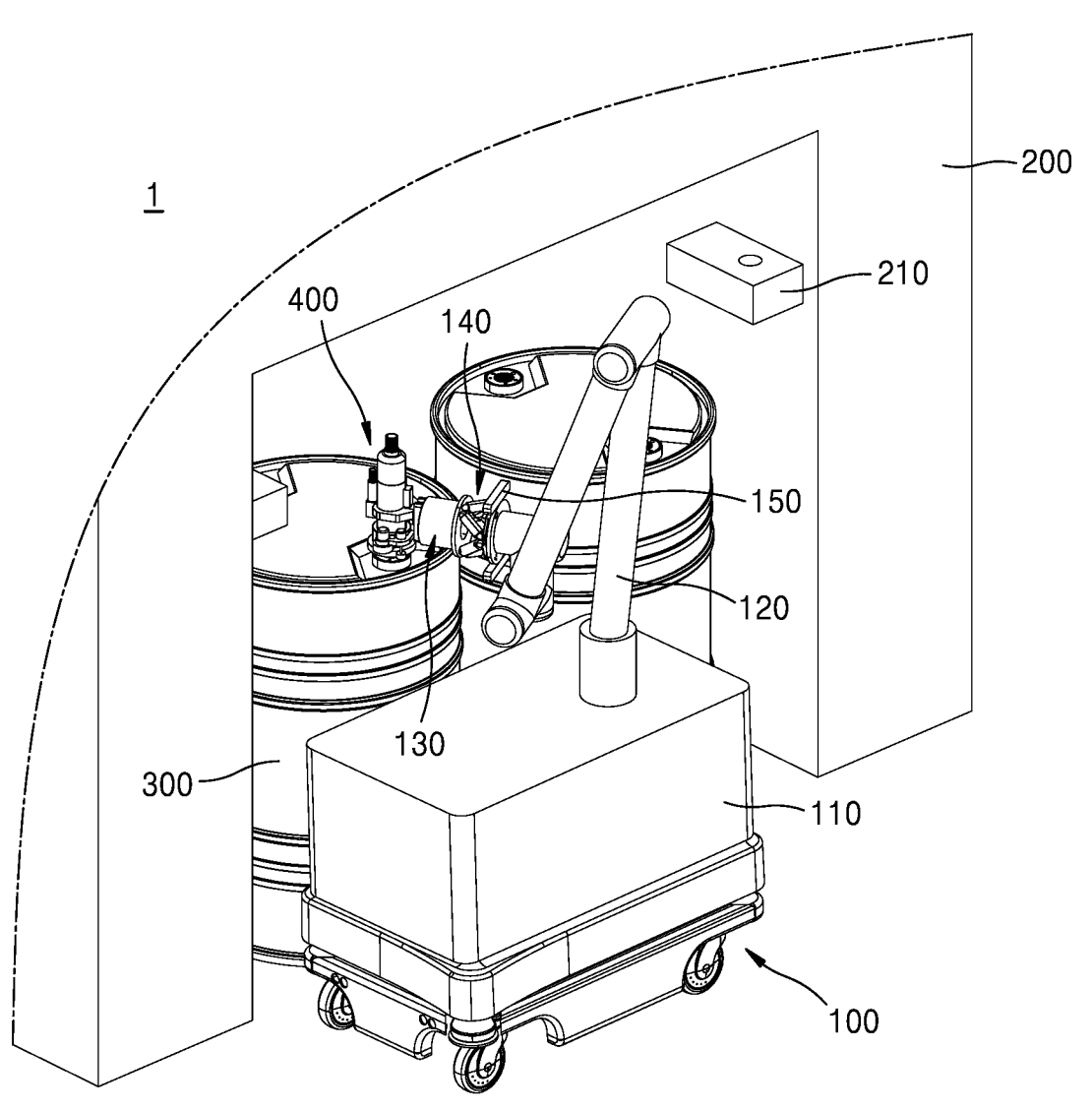
FIG. 1 is a schematic perspective view illustrating a drum coupling automation robot according to an embodiment.

Hereinafter, embodiments of the technical idea of the inventive concept will be described in detail with reference to the accompanying drawings. The same reference numerals are used for the same components in the drawings, and redundant descriptions thereof will be omitted.

Figure 2:
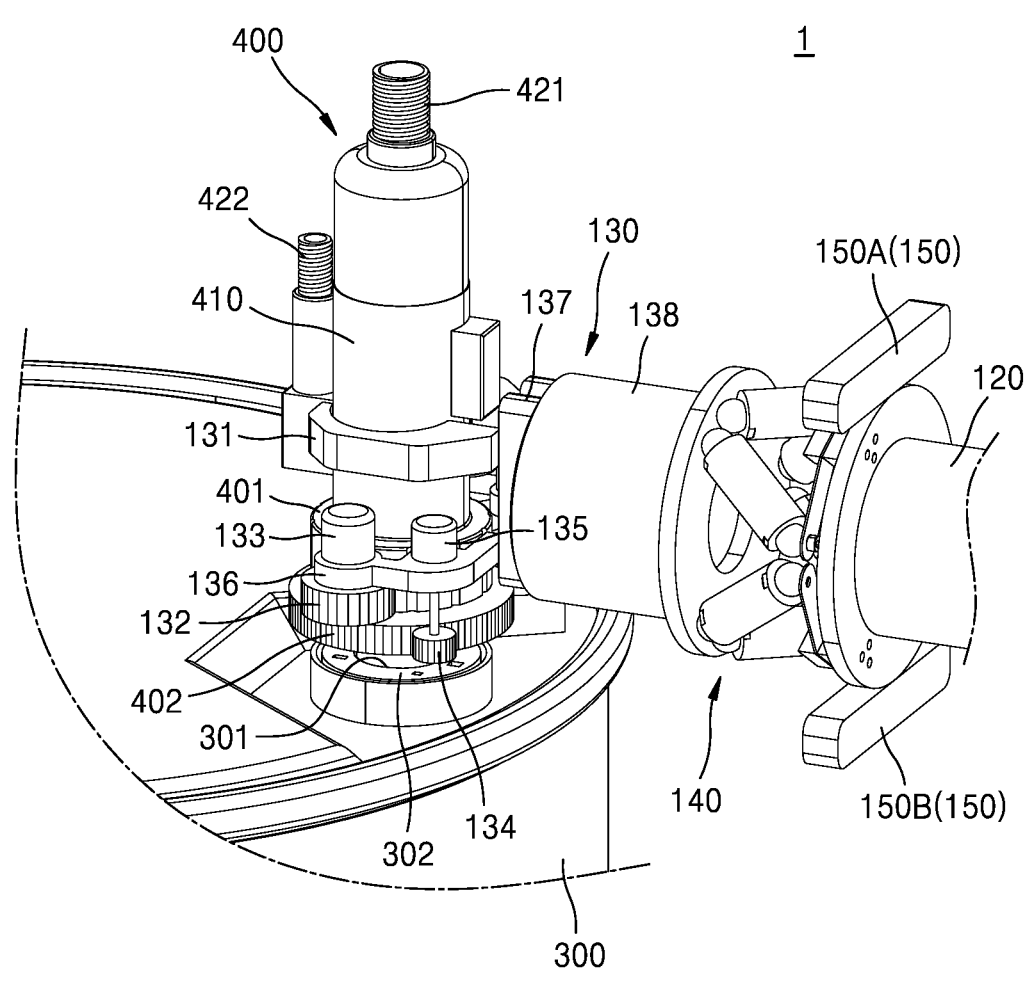
FIG. 2 is an enlarged schematic perspective view of a part of a drum coupling automation robot according to an embodiment.
Figure 3A:
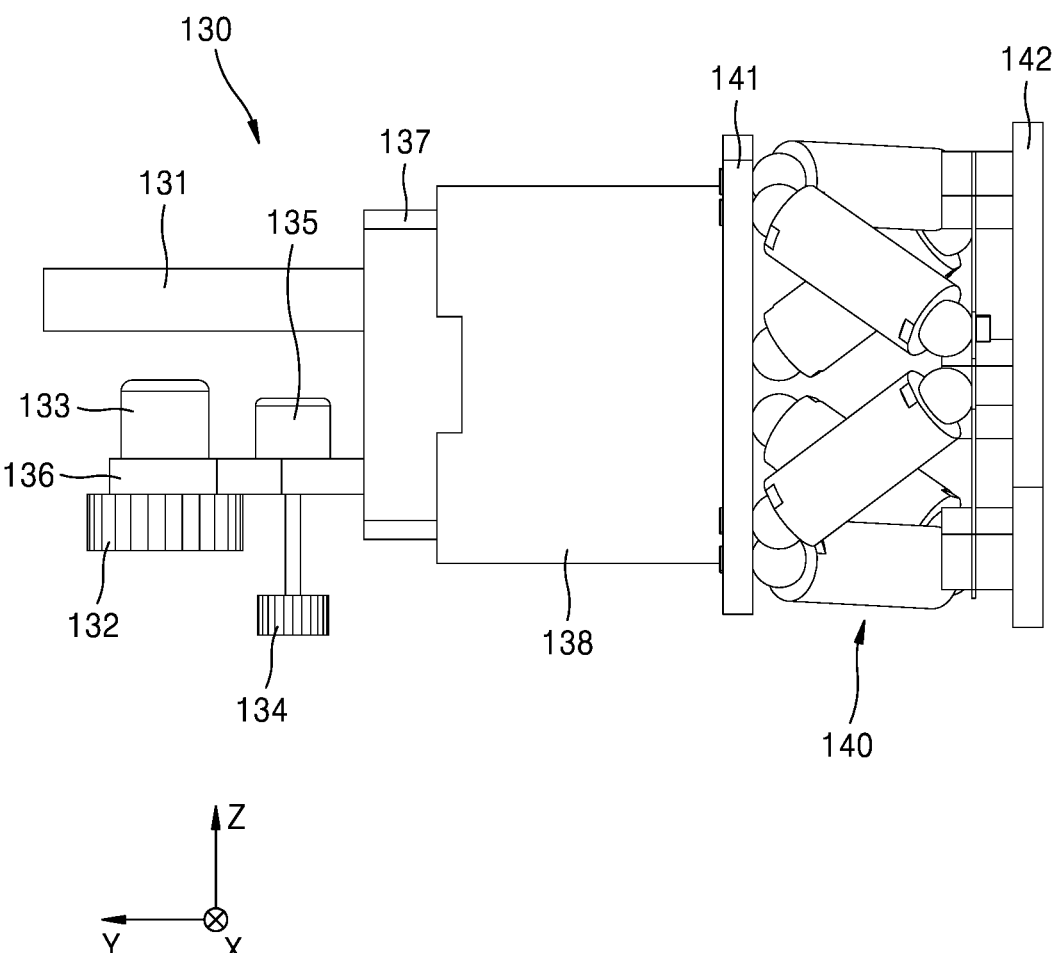
FIG. 3A is a side view illustrating a coupler gripper and an adaptation device included in a drum coupling automation robot according to an embodiment.
Figure 3B:
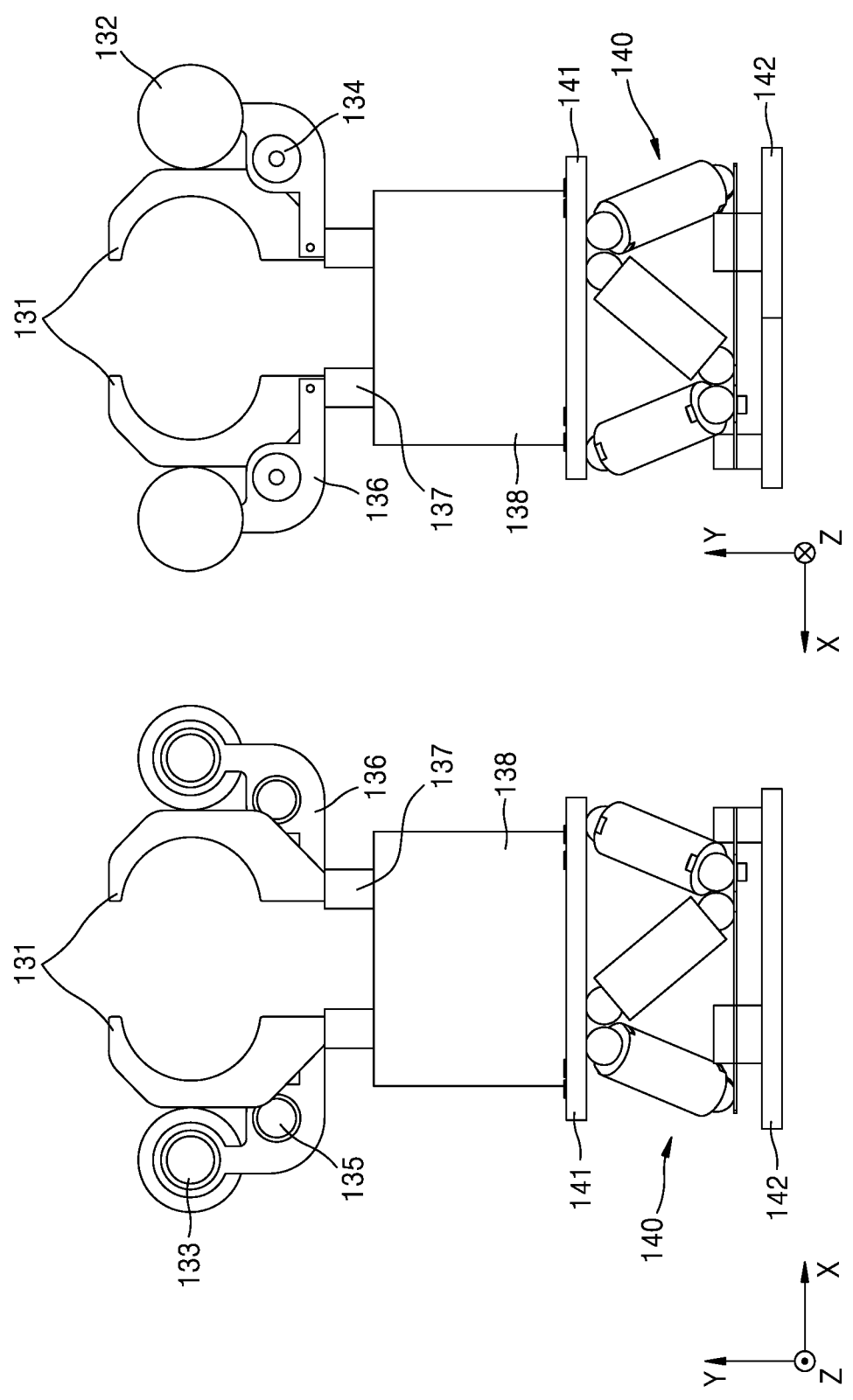
FIG. 3B is a top view and a bottom view respectively illustrating a coupler gripper and an adaptation device included in a drum coupling automation robot according to an embodiment.
Figure 4:
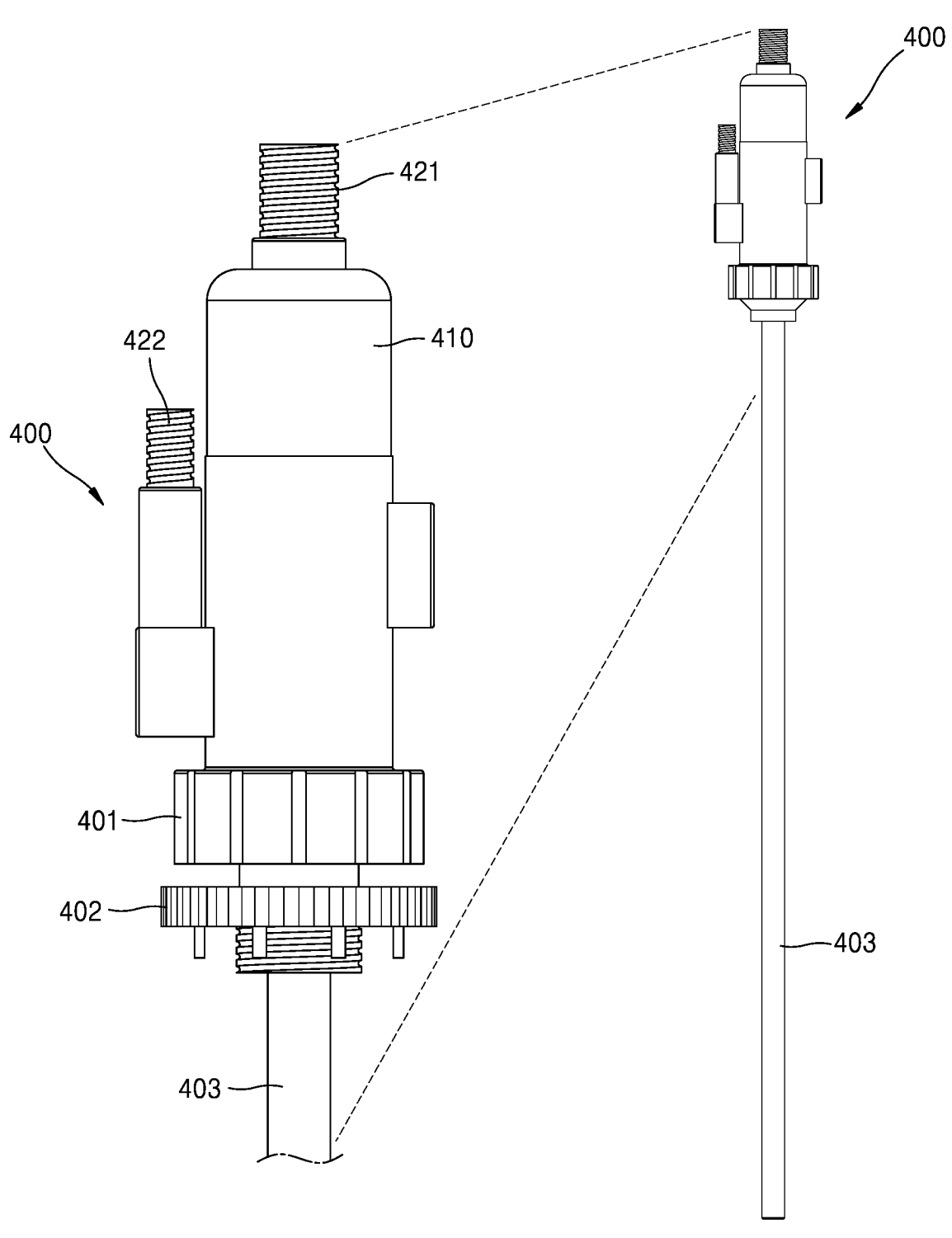
FIG. 4 is a side view illustrating a coupler.

FIG. 1 is a schematic perspective view illustrating a drum coupling automation robot 1 according to an embodiment. FIG. 2 is an enlarged perspective view of a part of the drum coupling automation robot 1 according to an embodiment of the inventive concept for performing a coupling operation. FIG. 3A is a side view illustrating a coupler gripper 130 and an adaptation device 140 included in the drum coupling automation robot 1 according to an embodiment. FIG. 3B is a top view and a bottom view respectively illustrating a coupler gripper 130 and an adaptation device 140 included in the drum coupling automation robot 1 according to an embodiment. FIG. 4 is a side view illustrating a coupler 400.

Referring to FIGS. 1 and 2, the drum coupling automation robot 1 according to an embodiment may include a driving unit 100, a robot arm 120, a coupler gripper 130, and an adaptation device 140. The robot arm 120 may grip the coupler 400, the coupler 400 may be inserted into a drum 300, and the coupler 400 may be coupled or fastened to the drum 300. In some embodiments, the drum 300 may be a cylindrical or barrel-shaped container for storing liquid chemicals to be used for semiconductor processes. The drum 300 may have a drum hole 301 at an upper surface thorough which liquid chemicals are supplied into the drum 300 or discharged from the drum 300. More specifically, a coupler tube 403 of the coupler 400 may be inserted into the drum hole 301 of the drum 300.

The driving unit 100 may be an autonomous driving robot. In an embodiment, the driving unit 100 may include autonomous mobile robots (AMR). The driving unit 100 may move through a plurality of wheels provided on a driving unit body 110. The moving direction and moving speed of the driving unit 100 may be controlled by a control unit (not shown) provided in the driving unit 100. Using various sensors such infrared sensors and cameras, and the control unit (not shown) and separate central control devices included in the driving unit 100, the driving unit 100 may determine an optimal movement path to a destination which avoids or bypasses obstacles to reach the destination, ensuring a safe and obstacle-free route to the destination.

The robot arm 120 may be provided to the driving unit 100. In an embodiment, the robot arm 120 may include a plurality of joints, and each joint may be configured to be capable of rotating in three directions and rotating on an axis. In some embodiments, the robot arm 120 with multiple joints may include multiple segments or links connected by joints to allow the robot arm 120 to move and bend in multiple directions. Each joint provides a rotational degree of freedom, which enables the robot arm 120 to perform a wide range of movements. For example, the robot arm 120 may be a robot arm having multi-degree-of-freedom (multi-DOF). By the driving range of each joint, the robot arm 120 may move freely under the control of the control unit (not shown) provided within the drum coupling automation robot 1 or separately provided therefrom.

The adaptation device 140 may be arranged at one end of the robot arm 120. The coupler gripper 130 may be positioned on the opposite side of one surface of the adaptation device 140 connected to the robot arm 120. For example, the adaptation device 140 is arranged between the coupler gripper 130 and the robot arm 120, and the coupler gripper 130 and the robot arm 120 may be connected with each other. A detailed structure of the adaptation device 140 will be described later.

The adaptation device 140 may include a force/torque (F/T) sensor which measures an external force including a force and a torque applied to the coupler gripper 130 and converts the measured external force and torque to an electrical signal. In some embodiments, the force component of the F/T sensor may measure the amount of force applied in a specific direction, typically along the three spatial axes (X, Y, and Z). This force measurement may determine the amount of pressure or tension experienced by the coupler gripper 130 when subjected to external forces, such as pushing, pulling, or compression. The torque component of the F/T sensor may measure the rotational force or moment applied to the coupler gripper 130 around a specific axis. The torque component may provide information about the twisting or turning effect experienced by the coupler gripper 130 when torque is applied thereto. In some embodiments, the F/T sensor may include a strain gauge load cell, piezoelectric load cell, six-axis force/torque sensor, or dynamometer. The adaptation device 140 may be connected to the control unit (not shown) to transmit, to the control unit (not shown), a measurement value including the force and torque measured by the F/T sensor. The control unit (not shown) may control the coupler gripper 130, the robot arm 120, and the like based on the measured value measured by the adaptation device 140 to achieve the desired values of the force and torque applied to the coupler gripper 130. In an embodiment, when a force in a specific direction is applied to the coupler gripper 130, the adaptation device 140 transmits the measured direction and magnitude of the force to the control unit (not shown). The control unit (not shown) may control the coupler gripper 130, the robot arm 120, and the driving unit 100 based on the measured value received to adjust the force in a specific direction within an appropriate range. For example, the coupler gripper 130, the robot arm 120, and the driving unit 100 may be controlled such that the force applied to the coupler gripper 130 is within the range that the coupler 400 may be properly coupled to a drum hole 301 of the drum 300 (i.e., the coupler 400 is securely coupled to the drum hole 301 without applying excessive force and/or torque to the drum hole 301). The magnitude of the force acting on the coupler gripper 130 in which the coupler 400 may be properly fastened to the drum hole 301 of the drum 300 may be 5 N or less, but this inventive concept is not limited by this example.

Referring to FIGS. 1, 2, 3A, 3B, and 4, the coupler gripper 130 may include a body unit 138, which is coupled and arranged on one surface of a mobile platform 141 of the adaptation device 140 to be described below, a finger drive unit 137 placed on one side of the body unit 138, a finger 131 configured to be driven by the finger drive unit 137, a roller support unit 136 located adjacent to the finger 131, and a first roller 132 and a second roller 134 placed on the roller support unit 136. In some embodiments, the first roller 132 may include a series of first teeth along a perimeter of the first roller 132, and the second roller 134 may include a series of second teeth along a perimeter of the second roller 134. In the present specification, a first horizontal direction refers to an X-axis direction, a second horizontal direction refers to a Y-axis direction perpendicular to the X-axis direction, and a vertical direction refers to a Z-axis direction. Here, the vertical direction is perpendicular to both the first horizontal direction and the second horizontal direction.

The finger 131 for gripping the coupler 400 may be operated by the finger driving unit 137. A pair of fingers 131 are provided, and thus, the pair of fingers 131 may contact and hold the respective opposite sides of the coupler 400, as shown in FIG. 3B. Therefore, the pair of fingers 131 may be spaced apart from each other so that the coupler 400 may be positioned between the pair of fingers 131, and the pair of fingers 131 may be operated to be separated from or close to each other by the finger driving unit 137. The pair of fingers 131 may be moved up and down within a predetermined range in the vertical direction (Z-axis direction) by the finger driving unit 137. The finger sensor connected to the finger 131 may measure the force received by the finger 131 from the coupler 400, that is, the force of the finger 131 to hold the coupler 400 and may transmit the measurement value to the control unit (not shown). The control unit (not shown) may control the fingers 131 to adjust the force of gripping the coupler 400 based on the signal received from the finger sensor.

The roller support unit 136 may be arranged to be spaced apart from the finger 131 but adjacent to the finger 131. The roller support unit 136 may be fixed to the finger driving unit 137 to move with the finger 131, or unlike the illustration, the roller support unit 136 may be moved by a separate driving unit rather than the finger driving unit 137.

The roller support unit 136 may be configured as a pair. A first roller 132 and a second roller 134 may be provided on the pair of roller support units 136, respectively. In an embodiment, as shown in FIG. 3A, the roller support unit 136 may be positioned below the finger 131 to be spaced apart from the finger 131. The first roller 132 and the second roller 134 may be positioned at a lower end of each of the roller support units 136. The first roller 132 may be driven by the first roller driving unit 133. The second roller 134 may be driven by the second roller driving unit 135. In an embodiment, the first roller 132 and the second roller 134 may be rotated by the first roller driving unit 133 and the second roller driving unit 135, respectively. Unlike the description given above, the first roller 132 and the second roller 134 may be driven by the power transmitted through the roller support unit 136, and a method of driving the first roller 132 and the second roller 134 is not limited by this specification.

The first roller 132 may contact the circumference of a coupler nut 401 to be described below. At the same time, the second roller 134 may contact the circumference of a coupler key code 402 to be described below. The contact between the first roller 132 and the coupler nut 401 and the contact between the second roller 134 and the coupler key code 402 may be achieved through the behavior of the roller support unit 136 provided with the first roller 132 and the second roller 134. The roller support unit 136 may be integrated with the finger 131 so as to operate together with the finger 131. When the first roller 132 rotates, the coupler nut 401 in contact with the first roller 132 may rotate. In some embodiments, the coupler nut 401 may include a series of third teeth on a perimeter of the coupler nut 401. The series of the third teeth may be engaged with the series of the first teeth of the first roller 132. In some embodiments, the coupler key code 402 may include a series of fourth teeth on a perimeter of the coupler key code 402. The series of the fourth teeth may be engaged with the series of the second teeth of the second roller 134.

When the second roller 134 rotates, the coupler key code 402 in contact with the second roller 134 may rotate. The second roller 134 may adjust the degree of rotation of the coupler key code 402 so that the coupler key code 402 may be properly coupled with a drum key code 302. The relationship between the coupler key code 402 and the drum key code 302 is described below. When the coupler key code 402 rotates and reaches an appropriate state to be combined with the drum key code 302, the robot arm 120 may move downward so that the coupler key code 402 may be combined with the drum key code 302. The coupler key code 402 is coupled to the drum key code 302, and the first roller 132 is rotated so that the coupler nut 401 may be fastened to the screw provided in the drum hole 301 provided in the drum 300.

Referring to FIG. 4, the coupler 400 may include a coupler body 410, a coupler nut 401 located at the bottom of the coupler body 410, a coupler key code 402 located at the bottom of the coupler nut 401, a first inlet/outlet 421 and a second inlet/outlet 422 provided on the coupler body 410, and a coupler tube 403 extending from the bottom of the coupler body 410.

The first inlet/outlet 421 may discharge the material stored in the drum 300. For example, the material stored in the drum 300 after being sucked through the coupler tube 403 may be discharged through the first inlet/outlet 421. When the material stored in the drum 300 is discharged through the first inlet/outlet 421, the second inlet/outlet 422 may supply a gas to fill the empty space generated in the drum 300. In an embodiment, the gas that may be supplied through the second inlet/outlet 422 may be air or nitrogen. The coupler body 410 may be configured to discharge, to the first inlet/outlet 421, the material stored in the drum 300 inhaled through the coupler tube 403, and at the same time, the second inlet/outlet 422 may supply a gas inside the drum 300. The internal configuration of the coupler body 410 is omitted herein.

The coupler body 410 may include separate pipelines. A first pipeline of the separate pipelines may be connected to the first inlet/outlet 421. A second pipeline of the separate pipelines may be connected to the second inlet/outlet 422. For example, the material contained in the drum 300 may move to the first inlet/outlet 421 of the coupler 400 via the first pipeline of the coupler body 410. The gas may be supplied into the inside of the drum 300 via the second pipeline of the coupler body 410 to prevent a vacuum force from blocking the moving of the material stored in the drum 300 toward the first inlet/outlet 421 of the coupler 400. In this specification, the separate pipelines connected to the first inlet/outlet 421 and the second inlet/outlet 422, respectively, are omitted to clearly illustrate this inventive concept.

The coupler nut 401 and the coupler key code 402 may be located adjacent to a portion where the coupler body 410 and the coupler tube 403 of the coupler 400 are connected. In some embodiments, the coupler nut 401 and the coupler key code 402 may be located at a lower portion of the coupler body 410 to which the coupler tube 403 is connected. The coupler key code 402 may be configured to rotate separately from the coupler nut 401 and to move up and down within a predetermined range. The coupler key code 402 may be coupled to the drum key code 302 arranged in the drum hole 301 provided in the drum 300.

The coupler key code 402 is configured to be combined with a specific drum key code 302 provided around the drum hole 301 of the drum 300. The drum key code 302 may have a shape characteristically assigned depending upon the drum 300. For example, the shape of the drum key code 302 may be set according to a material (e.g., a liquid chemical) which is to be stored in the drum 300 or which is to be discharged from the drum 300. The shape may have a circular point or line shape dug inside the drum 300 when viewed from the outside of the drum 300. This inventive concept is not limited by the shape. The coupler key code 402 is configured to be engaged with a characteristically assigned shape of a specific drum key code 302. For example, the coupler key code 402 may include a protrusion portion complementarily engaged with the shape of the drum key code 302.

When the material is introduced and discharged from the drum 300 storing the material through the coupler key code 402 and the drum key code 302, the coupler 400 is connected to a drum 300 other than the target drum 300 to prevent material mixing problems, and the coupler 400 and the drum 300 may be combined more smoothly. For example, when the material fills the drum 300 or is discharged from the drum 300, the coupler 400 is connected to the target drum 300 using the engagement of the coupler key code 402 and the drum key code 302, The use of the coupler key code 402 and the drum key code 302 may prevent material mixing in the filling or discharging, ensuring error-free filling the material in the drum 300 or discharging the material from the drum 300. The coupler key code 402 and drum key code 302 prevent improper engagement between the coupler 400 and the drum 300.

The coupler nut 401 and the coupler key code 402 included in the coupler 400 used in the drum coupling automation robot 1 according to an embodiment may be exposed to the outside. The coupler 400 may be fastened to the drum 300 by the drum coupling automation robot 1 according to an embodiment. In addition, since the coupler nut 401 and the coupler key code 402 included in the coupler 400 are exposed to the outside, the operator may selectively and manually fasten the coupler 400 to the drum 300. In other words, when a problem occurs in the process of fastening the drum 300 and the coupler 400, it is easy for the operator to fasten the coupler 400 to the drum 300 or to separate the coupler 400 from the drum 300 through selective manual work.

Selective manual work refers to manually coupling between the coupler 400 and the drum 300 by a worker instead of automatic coupling by the drum coupling automation robot 1.

When coupling the drum 300 and the coupler 400, the coupler 400 having a general structure is fastened to the drum 300 by the drum coupling automation robot 1 according to an embodiment, without using a separate dedicated equipment, thereby facilitating maintenance and repair of the facility.

At least one vision sensor 150 may be provided on one side of the adaptation device 140. For example, the vision sensor 150 may be provided in the direction of looking at the coupler gripper 130 on the side of a fixed platform 142 of the adaptation device 140. As shown in FIGS. 1 and 2, vision sensors may be spaced apart from each other and arranged vertically and symmetrically with reference to the coupler gripper 130 and the adaptation device 140 that are connected with each other. Alternatively, unlike the illustration, vision sensors may be arranged left and right to be symmetrical to each other around the coupler gripper 130 and the adaptation device 140. In some embodiments, the drum coupling automation robot 1 may include two or more vision sensors 150 to more accurately recognize the shape, position, and direction of objects. Although two vision sensors 150 are illustrated in FIGS. 1 and 2, the inventive concept is not limited thereto.

The vision sensor 150 may obtain visual information for some or all of a process in which the drum coupling automation robot 1 moves, a process in which the drum coupling automation robot 1 moves to the target drum 300, a process in which the coupler gripper 130 checks the coupler 400 mounted on a coupler storage rack 210 of the frame unit 200, a process in which the coupler gripper 130 grips the coupler 400 placed on the coupler storage rack 210, a process in which the coupler 400 is transported to the drum 300 subject to coupling, a process in which the coupler 400 is coupled to the drum hole 301 of the drum 300, and a process in which the coupler 400 is separated from the drum hole 301 of the drum 300.

The visual information may include information including the shape, position, and direction of surrounding objects including the frame unit 200, the drum 300, the coupler 400, the coupler gripper 130, the robot arm 120, and the driving unit 100.

In an embodiment, the vision sensor 150 may include a wide-angle camera and a narrow-angle camera capable of field of view (FOV) adjustment, lighting, an infrared camera, a laser light source, or the like. However, the configuration of the vision sensor 150 does not limit the inventive concept.

The visual information obtained by the vision sensor 150 may be transmitted to the control unit (not shown) described above. The control unit (not shown) that receives the visual information may control the behavior of the driving unit 100, the robot arm 120, and the coupler gripper 130 so that the drum coupling automation robot 1 according to an embodiment may smoothly attach and detach the coupler 400 to and from the drum 300, by extracting the visual information necessary for the work process. Therefore, through the vision sensor 150, the drum coupling automation robot 1, which is an embodiment, may more smoothly perform the process of fastening and separating the coupler 400 to and from the drum 300.

The drum coupling automation robots 1 may attach couplers 400 to a plurality of drums 300 or detach the couplers 400 from the plurality of drums 300. Since the fastening of the drum 300 with the coupler 400 is not performed by separate dedicated equipment, a factory for fabricating semiconductor devices may be equipped with the smaller number of the drum coupling automation robots 1, according to an embodiment.

A material including a chemical or slurry stored in the drum 300 may be harmful to the human body. Since the coupler 400 may be fastened to the drum 300 through the drum coupling automation robot 1, which is an embodiment, the possibility of the operator being directly or indirectly exposed to the material in the drum 300 or the fume of the material is reduced. Accordingly, the drum coupling automation robot 1 according to an embodiment may reduce a risk factor to a worker.

Figure 5:
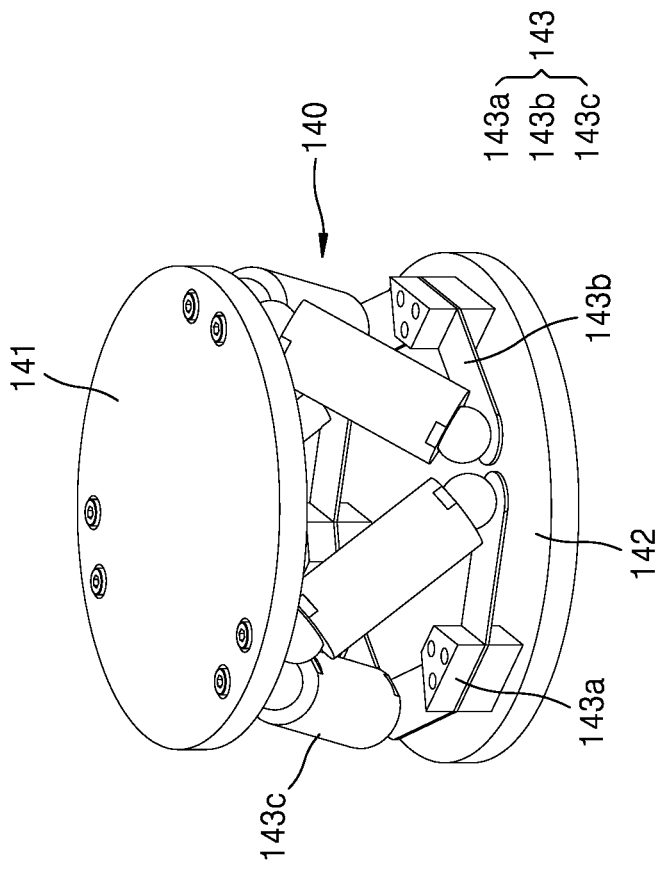
FIG. 5 is a view illustrating an adaptation device provided in a drum coupling automation robot according to an embodiment.
Figure 5:
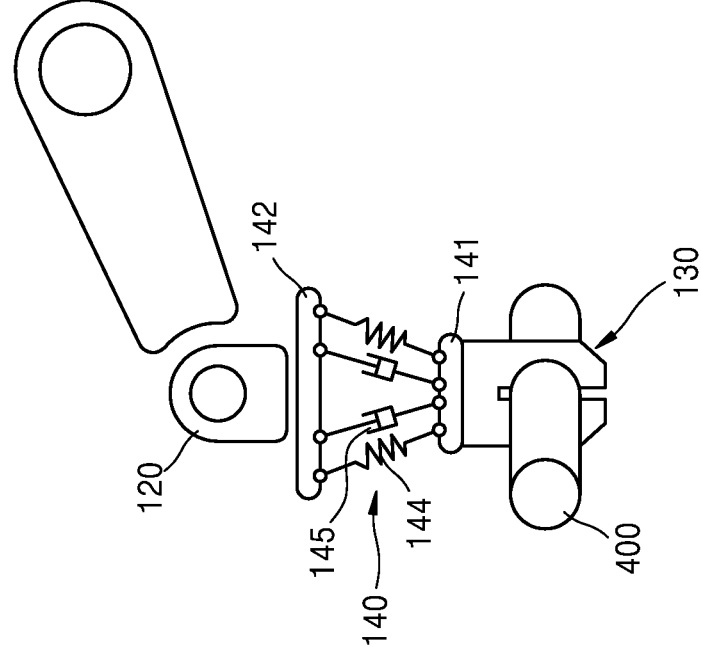

FIG. 5 is a view illustrating an adaptation device 140 provided in a drum coupling automation robot 1 according to an embodiment;

Referring to FIGS. 1, 2, and 5, the adaptation device 140 may be provided with an adaptation unit 143 between a mobile platform 141 and a fixed platform 142, in which the mobile platform 141 and the fixed platform 142 are spaced apart each other. The mobile platform 141 and the fixed platform 142 may face each other.

The adaptation unit 143 may include a support member 143c connecting the mobile platform 141 to the fixed platform 142, a leaf spring 143b connected to one end of the support member 143c on the fixed platform 142, and a support block 143a with a sensor for measuring force and torque transmitted from the leaf spring 143b. The support member 143c may include an elastic member 144 and a damper 145. In the present specification, each of the elastic member 144 and the damper 145 may be referred to as the support member 143c.

As shown in FIGS. 1 and 2, the adaptation device 140 is located between one end of the robot arm 120 and the coupler gripper 130, so that one end of the robot arm 120 and the body unit 138 of the coupler gripper 130 may be connected with each other. In an embodiment, the adaptation device 140 may measure a measurement value including force and torque applied to the coupler gripper 130. For example, the relative motion of the mobile platform 141 with respect to the fixed platform 142 may be measured through the sensor. At the same time, since the adaptation device 140 includes an elastic member 144 and a damper 145, the adaptation device 140 may alleviate the impact that occurs between the coupler gripper 130 and the robot arm 120.

The adaptation device 140 provides adaptability to various axial and rotational directions. For example, the adaptation device 140 may have a force resolution of about 1 N or less and may provide adaptability of about 10 mm. It is possible to automatically compensate for position errors and rotation errors that occur during work. For example, a force of an appropriate magnitude for coupling the coupler key code 402 to the drum key code 302 may be provided to the coupler 400, and an excessive force may be prevented from being applied to the coupler 400. Accordingly, the drum coupling automation robot 1, which is an embodiment including the adaptation device 140, may improve the precision and reliability of the coupling operation.

The adaptation device 140 may obtain a measurement value including force and torque acting on some or all of a process of gripping the coupler 400 placed on the coupler storage rack 210 by the coupler gripper 130 when the robot arm 120 is moved by the drum coupling automation robot 1, a process of transporting the coupler 400 to the drum 300 subject to coupling, a process of coupling the coupler 400 to the drum hole 301 of the drum 300, and a process of separating the coupler 400 from the drum hole 301 of the drum 300.

The adaptation device 140 may transmit the measured measurement value to the control unit (not shown). When the external force received by the coupler 400 is out of a predetermined range on the basis of the received measurement value, the control unit (not shown) controls the movement of the robot arm 120, the coupler gripper 130, and the driving unit 100, thereby reducing the external force applied to the coupler 400 within a predetermined range.

For example, when the external force received by the coupler 400 is excessive due to a pinch of the side of the coupler 400, in a process in which the coupler 400 is inserted into the drum hole 301 of the drum 300, the coupler 400 may move downward in a state in which the coupler key code 402 is accurately engaged with the drum key code 302, in the process of coupling the coupler key code 402 to the drum key code 302, thereby causing the external force received by the coupler 400 to be excessive. When an external force outside a certain range is generated, the adaptation device 140 may alleviate the impact caused by the external force and simultaneously transmit the measured measurement value to the control unit (not shown). The control unit (not shown) may control the movement of the robot arm 120, the coupler gripper 130, and the driving unit 100 so that the external force does not deviate from or exceed a certain range based on the measurement value obtained from the adaptation device 140 and the visual information obtained through the vision sensor 150.

The control of the configuration of the drum coupling automation robot 1 according to an embodiment based on the visual information and the measurement value of the control unit (not shown) may be performed in all processes or some processes for coupling the coupler 400 to the drum 300. Therefore, the drum coupling automation robot 1, according to an embodiment, which is controlled by the vision sensor 150 and the adaptation device 140, may more smoothly fasten the coupler 400 to the drum 300 or separate the coupler 400 from the drum 300. In addition, the drum coupling automation robot 1 according to an embodiment may fasten the coupler 400 to the drum 300 or may separate the coupler 400 from the drum 300 using one robot arm 120.

The drum coupling automation robot 1, which is an embodiment, may include the control unit (not shown) and the driving unit 100 which are implemented as hardware, software, or both. The drum coupling automation robot 1 may be configured by hardware or software, or may be configured by multiple hardware or software. The function (processing) may be realized by a computer having a central processing unit (CPU) or memory. For example, a program for performing a method (control method) according to embodiments may be stored in a storage device, and each function may be realized by executing the program stored in the storage device on the CPU.

The program may be stored using various types of non-transitory computer readable media and supplied to a computer. The non-transitory computer readable media include various types of tangible storage media. Examples of non-transitory computer-readable media include magnetic recording media (e.g., flexible disks, magnetic tapes, hard disk drives), optical magnetic recording media (e.g., optical magnetic disks), compact disk read only memory (CDROM), CD-R, CD-R/W, semiconductor memory (e.g., mask read only memory (mask ROM), Programmable ROM (PROM), Erasable PROM (EPROM), flash ROM, and random access memory (RAM). In addition, programs may be supplied to computers by various types of transitory computer-readable media. Examples of transitory computer-readable media include electrical signals, optical signals, and electromagnetic waves. The transitory computer-readable medium may supply programs to the computer through wired communication channels such as wires and optical fibers, or wireless communication channels.

Figure 6:
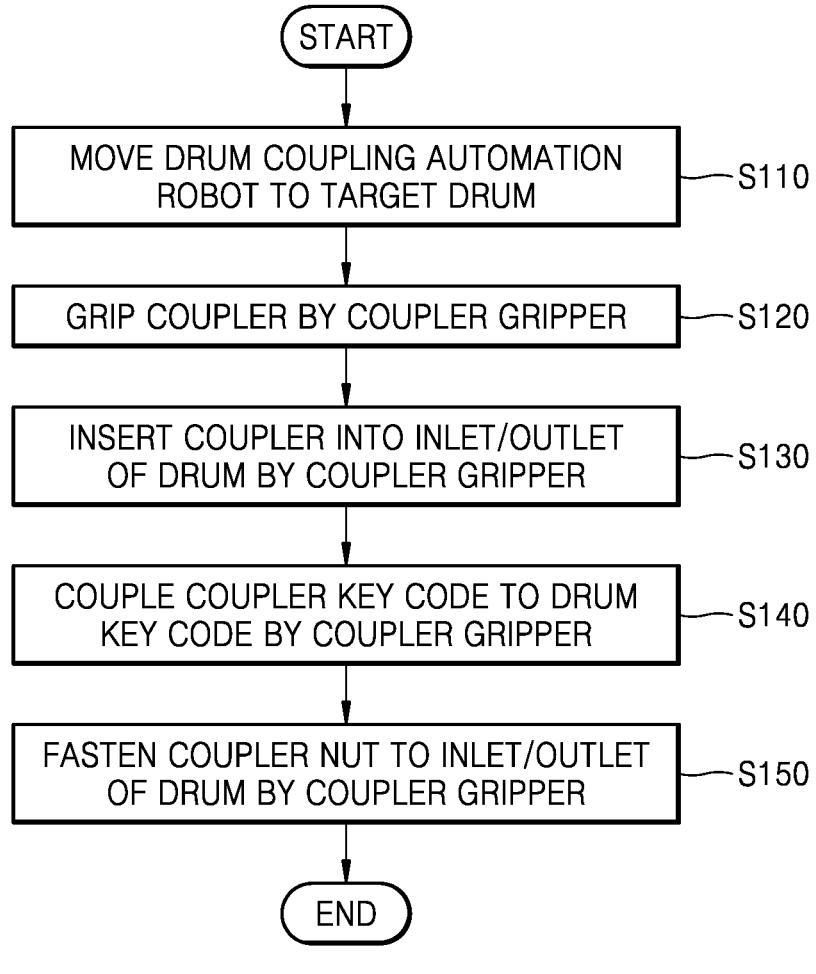
FIG. 6 is a flowchart schematically illustrating a drum coupling automation method according to an embodiment.

FIG. 6 is a flowchart schematically illustrating a drum coupling automation method according to an embodiment. Redundant descriptions of the same features as those described above will be omitted.

With reference to the descriptions of FIGS. 1 to 5, a drum coupling automation method according to an embodiment includes the operations of: moving the drum coupling automation robot 1 to the target drum 300 through the driving unit 100 having the robot arm 120 (S110); gripping the coupler 400 by the coupler gripper 130 (S120); inserting the coupler 400 into the drum hole 301 of the target drum 300 by the coupler gripper 130 (S130); coupling the coupler key code 402 to the drum key code 302 by the coupler gripper 130 (S140); and fastening the coupler nut 401 to the drum hole 301 by the coupler gripper 130 (S150). Likewise, a process of separating the drum 300 from the coupler 400 is also possible, which is performed in the reverse order of the above-described operations, and thus, a separate description is omitted.

The visual information by the vision sensor 150 and the measured value by the adaptation device 140 may be obtained at all or some operations of the drum coupling automation method, which is an embodiment. The visual information and the measured value may be transmitted to the control unit (not shown). Based on the received visual information and the measured values, the control unit (not shown) may control the drum coupling automation robot 1 to perform the drum coupling automation method as described above.

Figure 7:
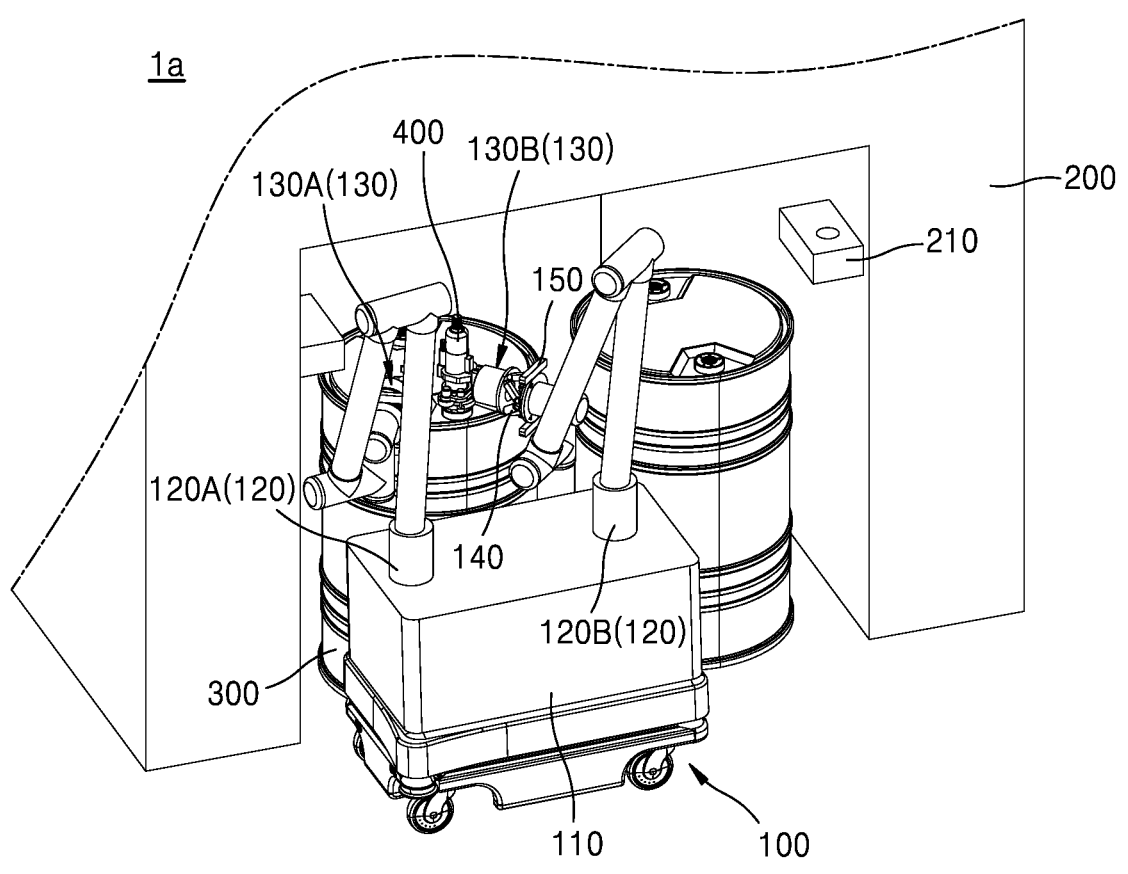
FIG. 7 is a schematic perspective view illustrating a drum coupling automation robot according to an embodiment.
Figure 8:
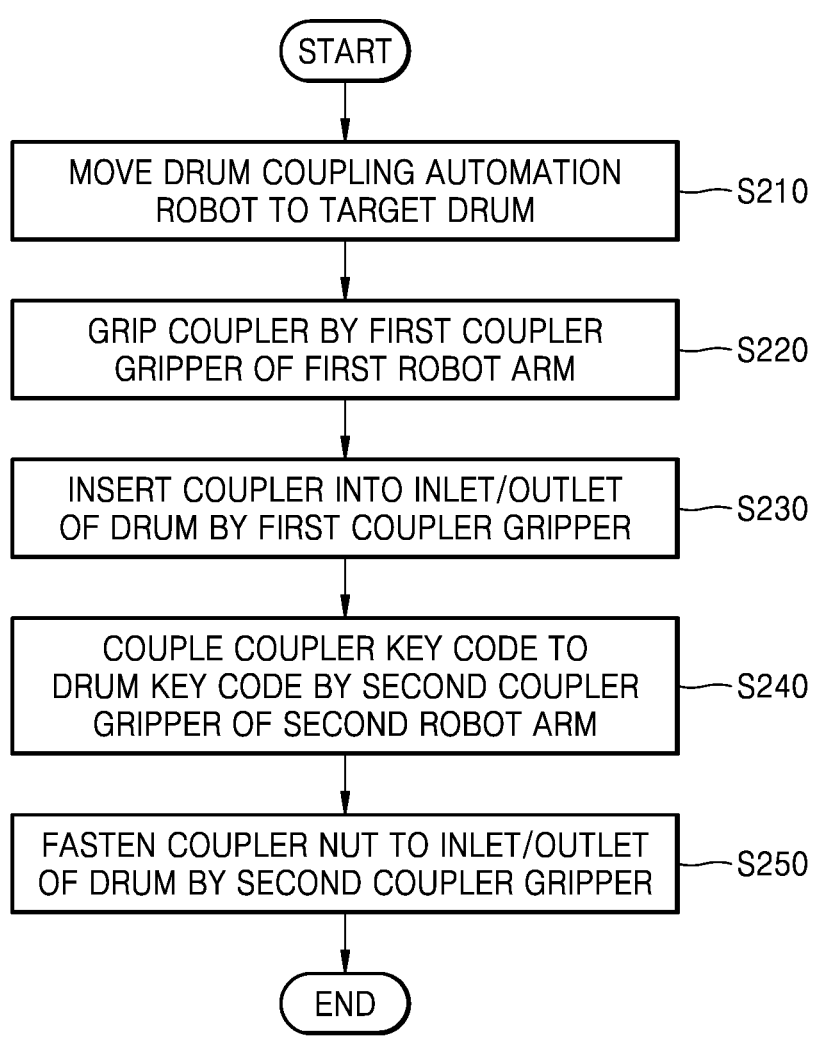
FIG. 8 is a flowchart schematically illustrating a drum coupling automation method according to an embodiment.

FIG. 7 is a schematic perspective view illustrating a drum coupling automation robot 1a according to an embodiment. FIG. 8 is a flowchart schematically illustrating a drum coupling automation method according to an embodiment. Redundant descriptions of the same features as those described above will be omitted.

Referring to FIGS. 7 and 8, the drum coupling automation robot 1a, which is an embodiment, may include a first robot arm 120A and a second robot arm 120B provided in the driving unit 100. An adaptation device 140 may be equipped at one end of each of the first robot arm 120A and the second robot arm 120B, and a coupler gripper 130 may be coupled to the adaptation device 140. Each of the first robot arm 120A and the second robot arm 120B may include a vision sensor 150. However, the drum coupling automation robot 1a, which is an embodiment, may not include the first roller 132, the second roller 134, the first roller driving unit 133, the second roller driving unit 135, and the roller support unit 136.

A drum coupling automation method through the drum coupling automation robot 1a according to an embodiment includes the operations of: moving the drum coupling automation robot 1a to a target drum 300 through the driving unit 100 having the robot arm 120 (S210); gripping the coupler 400 by the first coupler gripper 130A of the first robot arm 120A (S220); inserting the coupler 400 into the drum hole 301 of the target drum 300 by the first coupler gripper 130A (S230); coupling the coupler key code 402 to the drum key code 302 by the second coupler gripper 130B provided with the second robot arm 120B (S240); and fastening the coupler nut 401 to the drum hole 301 by the second coupler gripper 130B (S250). Likewise, a process of separating the drum 300 from the coupler 400 is also possible, which is performed in the reverse order of the above-described operations, and thus, a separate description is omitted.

The coupler key code 402 may be rotated and adjusted so that the first robot arm 120A grips the coupler 400 and inserts the coupler 400 into the drum hole 301 of the drum 300, and the second robot arm 120B couples the coupler key code 402 of the coupler 400 which is inserted into the drum hole 301 with the drum key code 302. In addition, the second robot arm 120B may rotate the coupler nut 401 to be fastened to the drum hole 301.

The control unit (not shown) may acquire the visual information and the measurement value through each of the adaptation devices 140 and each of the vision sensors 150 provided in the first robot arm 120A and the second robot arm 120B. The control unit (not shown) may control the drum coupling automation robot 1a on the basis of the acquired visual information and measured value.

The drum coupling automation robot 1a according to an embodiment may perform a drum coupling automation method through a multi-DOF robot arm, that is, the robot arm 120. Since the drum coupling automation robot 1a, which is an embodiment of the inventive concept, operates automatically for the coupler 400 in which the coupler key code 402 and the coupler nut 401 are exposed to the outside, it is possible to minimize the worker's exposure to chemicals. In addition, the difficulty of coupling work is reduced when working manually, so maintenance and repair of facilities are easier. Through the adaptation device 140 and the vision sensor 150 provided in this inventive concept, the coupler 400 may be easily coupled to the drum 300 or may be separated from the drum 300. Since the coupling is automatically performed, a coupling operation may be unmanned and work tasks may be performed through a small number of automation robots, thereby improving economic efficiency.

While the inventive concept has been particularly shown and described with reference to embodiments thereof, it will be understood that various changes in form and details may be made therein without departing from the spirit and scope of the following claims.

What is claimed is:

1. A drum coupling automation robot comprising:
a robot; including a robot arm;
a coupler gripper connected to the robot arm;
an adaptation device including a force and torque sensor and connecting one end of the robot arm to the coupler gripper and configured to measure force and torque applied to the coupler gripper,
wherein the coupler gripper includes:
a body unit connected to one end of the adaptation device,
a finger configured to hold a portion of a coupler, wherein the coupler is provided with a coupler key code that is engaged with a drum key code provided with a drum hole of a drum,
a first roller engaged with the coupler key code of the coupler, wherein the first roller engaged with the coupler key code of the coupler is configured to rotate, and
a second roller engaged with a coupler nut provided with the coupler, wherein the second roller engaged with the coupler nut of the coupler is configured to rotate to fasten the coupler nut to the drum hole;
a vision sensor attached to the adaptation device; and
a control circuit electrically connected to the robot, the coupler gripper, the force and torque sensor, and the vision sensor.

2. The drum coupling automation robot of claim 1, wherein the control circuit is configured to control the robot, and the coupler gripper based on visual information obtained from the vision sensor and a measurement value obtained from the force and torque sensor.

3. The drum coupling automation robot of claim 1, wherein:
the finger is provided in a pair, and
the pair of fingers are configured to:
move up, down, left, and right, and
hold or release a part of the coupler.

4. The drum coupling automation robot of claim 2, wherein the control circuit is configured to:
insert the coupler into the drum hole based on the visual information;
adjust the first roller so that the coupler key code is fastened to the drum key code; and
adjust the second roller so that the coupler nut is fastened to the drum hole.

5. The drum coupling automation robot of claim 4, wherein:
the force and torque sensor is configured to transmit the measurement value of the force and torque generated in a process of gripping the coupler using the finger, in a process of detaching the coupler from the drum hole of the drum, or in a process of attaching the coupler to the drum hole of the drum, and
the control circuit is configured to further control movement of each of the robot, the robot arm, and the coupler gripper based on the measurement value of the force and torque sensor.

6. The drum coupling automation robot of claim 1, wherein:
the finger is provided in a pair,
the coupler gripper further comprises a pair of roller support units,
the pair of roller support units are attached to the pair of fingers, respectively, and
the first roller and the second roller are spaced apart from each other and attached to the pair of roller support units, respectively.

7. The drum coupling automation robot of claim 1, wherein the robot arm comprises a multi-degree-of-freedom (multi-DOF) robot arm.

8. The drum coupling automation robot of claim 1, wherein the vision sensor comprises two or more vision sensors which are spaced apart from each other.

9. The drum coupling automation robot of claim 2, wherein the visual information comprises a shape, a position, and a direction of each of the robot, the robot arm, the drum, the coupler, and the coupler gripper.

10. The drum coupling automation robot of claim 1, wherein the adaptation device further comprises:

a damper and an elastic member between the robot arm and the coupler gripper, and wherein the force and torque sensor is configured to measures the force and torque transmitted from the coupler gripper through the damper and the elastic member.

11. The drum coupling automation robot of claim 1, wherein the coupler key code and the coupler nut are exposed to the outside of the coupler so that engagement between the coupler key code and the drum key code is performed manually, distinct from automated engagement by the drum coupling automation robot.

12. The drum coupling automation robot of claim 1, wherein the robot comprises an autonomous mobile driving robot.

13. A drum coupling automation method comprising:

moving a drum coupling robot with a robot arm to a drum, wherein the robot arm is connected to a coupler gripper;

gripping a coupler using the coupler gripper;

inserting the coupler into a drum hole of the drum using the coupler gripper;

coupling a coupler key code of the coupler with a drum key code of the drum using the coupler gripper; and fastening a coupler nut of the coupler to the drum hole using the coupler gripper.

14. The drum coupling automation method of claim 13, wherein:

the drum coupling robot further comprises;

an adaptation device comprising: a force and torque sensor attached to a first end of the robot arm; and a vision sensor attached to the adaptation device, the coupler gripper is attached to the adaptation device, and the force and torque sensor is disposed between the coupler gripper and the robot arm.

15. The drum coupling automation method of claim 14, wherein:

the drum coupling robot further comprises a control circuit, the vision sensor is configured to:

obtain visual information in one or more of moving to the drum, gripping the coupler, inserting the coupler, coupling the coupler key code, and fastening the coupler nut; and transmit the visual information to the control circuit, and the visual information includes a shape, a position, and a direction of each of the drum coupling robot, the coupler, and the drum.

16. The drum coupling automation method of claim 15, wherein the force and torque sensor is configured to, in one or more of gripping the coupler, inserting the coupler, coupling the coupler key code, and fastening the coupler nut, obtain a measurement value of force and torque applied to the coupler gripper; and

transmit the measurement value to the control circuit.

17. The drum coupling automation method of claim 16, wherein the control circuit is configured to:

receive the visual information and the measurement value; and control the drum coupling robot based on the visual information and the measurement value.

18. The drum coupling automation method of claim 13, wherein the coupler key code and the coupler nut are exposed to the outside of the coupler so that engagement between the coupler key code and the drum key code is performed manually, distinct from automated engagement by the drum coupling robot.

19. A drum coupling automation robot comprising:

a robot including a first robot arm and a second robot arm;

a first adaptation device connected to the first robot arm;

a second adaptation device connected to the second robot arm;

a first coupler gripper coupled to a first end of the first robot arm through the first adaptation device;

a second coupler gripper coupled to a second end of the second robot arm through the second adaptation device, wherein the first adaptation device is disposed in a space between the first coupler gripper and the first end of the first robot arm and includes:

a fixed platform connected to the first end of the first robot arm;

a mobile platform connected to the first coupler gripper;

an elastic member connected to the fixed platform and the mobile platform;

a damper connected to the fixed platform and the mobile platform; and a first force and torque sensor disposed in a space between the fixed platform and the mobile platform and configured to measure force and torque applied to the first coupler gripper, wherein the force and torque applied to the first coupler gripper is transmitted from the first coupler gripper to the first force and torque sensor through the damper and the elastic member, and wherein the second adaptation device is disposed in a space between the second coupler gripper and the second end of the second robot arm and includes a second force and torque sensor configured to measure force and torque applied to the second coupler gripper;

two or more vision sensors attached to each of the first adaptation device and the second adaptation device; and a control circuit connected to the robot, the first robot arm, the second robot arm, the first coupler gripper, the second coupler gripper, the first force and torque sensor, the second force and torque sensor, and the two or more vision sensors attached to each of the first force and torque sensor and the second force and torque sensor.

20. The drum coupling automation robot of claim 19, wherein:

the control circuit is configured to control the robot, the first robot arm, the second robot arm, the first coupler gripper, and the second coupler gripper based on information obtained from the two or more vision sensors and a measurement value of the force and torque obtained from each of the first force and torque sensor and the second force and torque sensor, a coupler key code of a coupler and a coupler nut thereof are exposed to the outside of the coupler so that the coupler key code is manually engaged with a drum key code of a drum instead of the drum coupling automation robot, and the robot comprises an autonomous mobile driving robot.

* * * * *